US007150432B2

(12) United States Patent
Ouellette et al.

(10) Patent No.: US 7,150,432 B2
(45) Date of Patent: Dec. 19, 2006

(54) HORIZONTAL AUGMENTED THRUST SYSTEM AND METHOD FOR CREATING AUGMENTED THRUST

(75) Inventors: Richard P Ouellette, Lakewood, CA (US); Aaron J Kutzmann, Long Beach, CA (US); Darold B Cummings, Coeur d'Alene, CA (US)

(73) Assignee: The Boeing Company, Chicago, IL (US)

( * ) Notice: Subject to any disclaimer, the term of this patent is extended or adjusted under 35 U.S.C. 154(b) by 70 days.

(21) Appl. No.: 10/872,154

(22) Filed: Jun. 18, 2004

(65) Prior Publication Data

US 2006/0000943 A1    Jan. 5, 2006

(51) Int. Cl.
*B64D 33/02* (2006.01)
(52) U.S. Cl. ........................ 244/53 B; 244/54
(58) Field of Classification Search ........... 244/208, 244/207, 55, 210
See application file for complete search history.

(56) References Cited

U.S. PATENT DOCUMENTS 2,223,744 A * 12/1940 Stalker ........................ 244/208
2,241,521 A * 5/1941 Aime .......................... 244/45 R
RE23,105 E * 4/1949 Stalker ........................ 244/208
2,821,351 A * 1/1958 Utgoff ......................... 244/15
3,102,704 A * 9/1963 Griswold, II ............... 244/208
4,666,104 A * 5/1987 Kelber ........................ 244/12.1

OTHER PUBLICATIONS

Image Pulse Jet.png , Wikipedia.org.*
Pulse jet engine, http://en.wikipedia.org/wiki/Pulse_jet.*
Valveless pulse jet, http://en.wikipedia.org/wiki/Vavleless_Pulse_jet.*

* cited by examiner

*Primary Examiner*—Timothy D. Collins
(74) *Attorney, Agent, or Firm*—Harness Dickey & Pierce P.L.C.

(57) ABSTRACT

A horizontal augmented thrust system includes at least one wing. The wing includes a wing outer envelope, a trailing edge and a flap. At least one pulse jet engine is positioned entirely within the wing outer envelope. The pulse jet engine produces a pulsating thrust dischargeable adjacent the trailing edge of the wing and onto the flap.

11 Claims, 7 Drawing Sheets

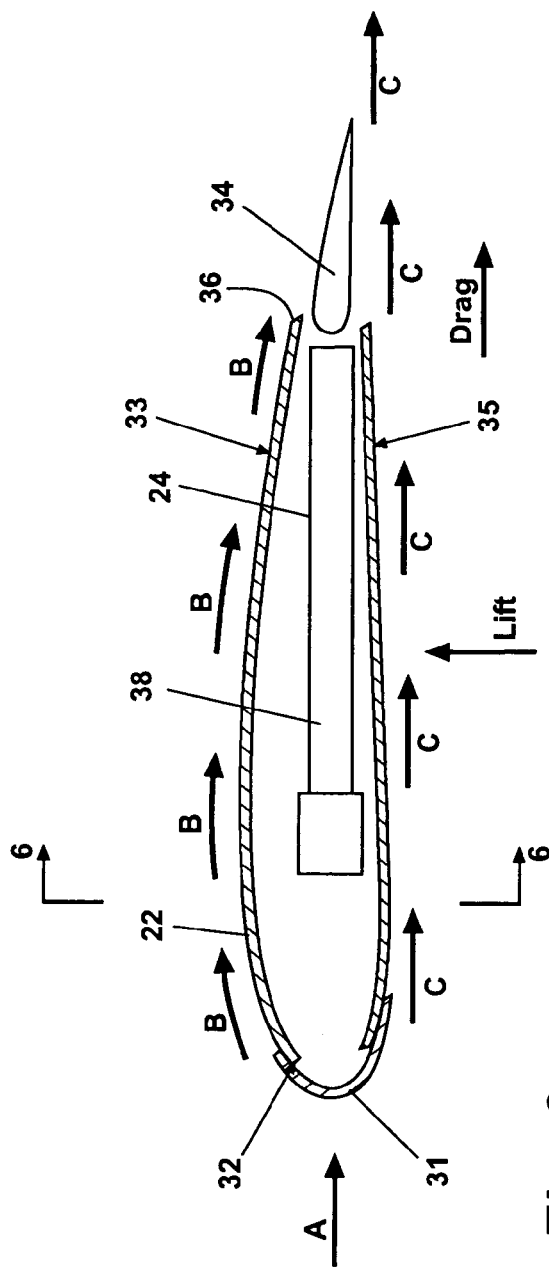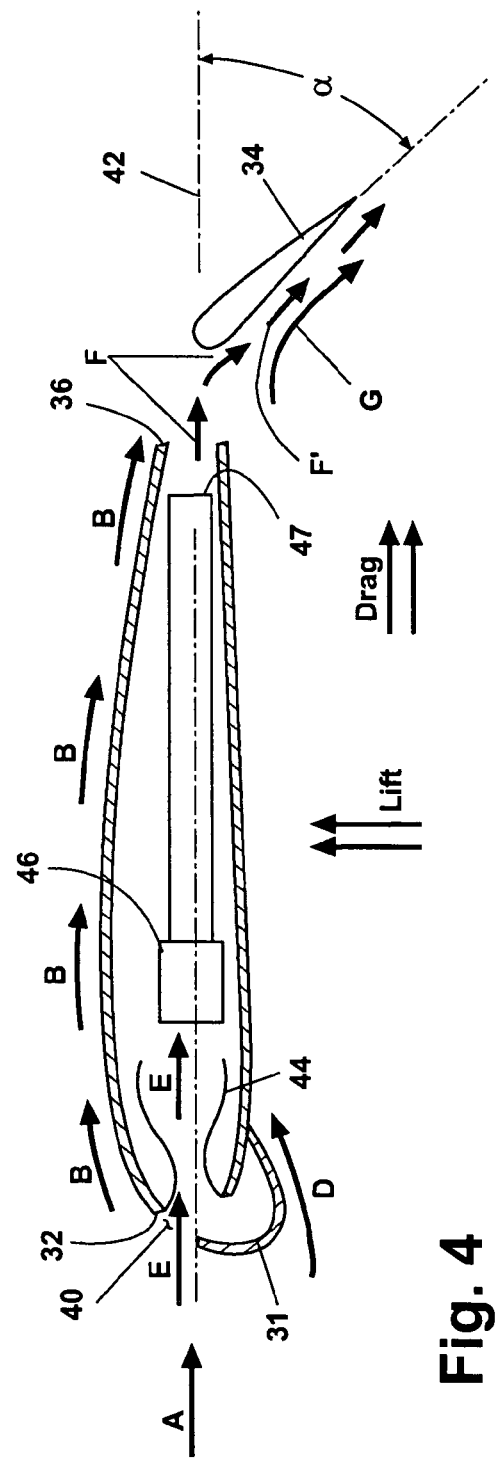
Fig. 3
Fig. 4

US 7,150,432 B2

HORIZONTAL AUGMENTED THRUST SYSTEM AND METHOD FOR CREATING AUGMENTED THRUST

FIELD OF THE INVENTION

The present invention relates in general to aircraft thrust systems and more specifically to a wing adapted thrust augmentation system and a method for creating an aircraft augmented thrust.

BACKGROUND OF THE INVENTION

Aircraft thrust augmentation systems are known which duct portions of flight engine thrust into the wings of the aircraft for discharge onto or adjacent to the wing flaps. These augmentation systems provide a steady state flow of engine exhaust during at least portions of the aircraft's flight, takeoff or landing phases to increase airflow over the flaps and thereby increase wing lift during periods when the aircraft's speed is below or approaching wing stall speed. Many of these systems use diverted axial engine fan or nozzle flow through dedicated ducting constructed in the main flight wings of the aircraft. Some of these systems provide individual thrust supply lines to each flap.

Disadvantages of these systems include the weight and wing structural load penalties from the ducting or supply lines. Also, failure of a propulsion engine, for example during takeoff, can result in loss of not only propulsion from the main engine, but loss of the additional thrust to a specific wing or set of flaps, which can cause a disproportionate lift generated by one of the wings and further exacerbates the loss of engine thrust. Plumbing for large amounts of relatively high pressure/temperature gas requires increased duct weight (to resist pressure) and increased diameter (which results in increased weight plus loss of aircraft volume) to accommodate insulation which prevents heat from soaking into the vehicle. Ducting also is often required to run the length of the wing(s) to reach each flap, which not only incurs large pressure losses but also reduces the resulting fuel holding capability of the wing(s). Each of the ducts or dedicated lines also requires individual controls to open or shut the duct or line, which further adds complexity and cost.

These systems have limited ability to throttle the augmented flow to the flaps, resulting in the inability to vary the wing lift during aircraft acceleration for takeoff or prior to landing. The limited ability to throttle occurs when exit area for the mass flow is choked (Mach number is 1) for a given design mass flow (pressure ratio). Mass flows below this value cause the system to un-choke. An un-choked system allows backflow and subsequent non-uniform flow which in turn can cause asymmetric lift. Augmentation flow therefore varies only with main engine thrust, which can be out of phase with the need for augmentation flow. For example, during preparation for landing the main flight engines are throttled back at the same time when the flaps are extended to increase wing lift, therefore airflow over the flaps from the augmentation system is not optimized when it is most needed.

SUMMARY OF THE INVENTION

According to a preferred embodiment of the present invention, a horizontal augmented thrust system includes at least one wing. The wing includes a wing outer envelope and a trailing edge. At least one pulse jet engine is positioned entirely within the wing outer envelope. The pulse jet engine produces a thrust dischargeable adjacent the trailing edge of the wing.

According to another preferred embodiment of the present invention, an aircraft wing includes a wing perimeter defining a wing upper surface, a wing lower surface, a wing leading edge and a wing trailing edge. A pulse jet engine is disposed entirely within the wing perimeter. A pulse jet engine inlet aperture is created adjacent the wing leading edge. A pulse jet engine discharge aperture is positioned adjacent the wing trailing edge. At least one flap is positioned adjacent the discharge aperture to deflect a discharge thrust of the pulse jet engine.

According to still another preferred embodiment of the present invention, a pulse jet engine having no moving parts is positioned entirely within a wing outer envelope. A wing flight control element is rotatably connectable to the wing and is positionable within a range of deployment angles. At least one main propulsion engine produces an aircraft main propulsion thrust. A pulse jet engine thrust in communication with the wing flight control element temporarily augments the main propulsion thrust.

According to yet another preferred embodiment of the present invention, a method is provided for augmenting a thrust of an aircraft. According to yet still another preferred embodiment of the present invention, a method is provided for generating lift from an aircraft wing using a pulse jet engine mounted on an aircraft.

A horizontal augmented thrust system and method for creating augmented thrust of the present invention offers several advantages. By positioning one or more pulse jets within the boundary of an aircraft wing, the pulsejets can directly provide a horizontal thrust component in addition to the thrust provided by the aircraft's main flight engine(s), thereby increasing thrust during takeoff and landing phases. Pulse jets of the present invention have no moving parts and can therefore be configured within the wings as integral load bearing structural wing members. This design requires only a fuel injector and an ignition source and is therefore very simple, low cost and needs little service or maintenance. The pulsed discharge of the pulse jet engines when directed over a wing flap increases air speed over the flap, therefore increasing wing lift. The pulsed discharge also delays buildup of boundary layer air on the flaps, therefore permitting an increased deployment angle of the flap(s) before airstream separation occurs. This in turn provides more lift for lower speeds with commensurate reductions in takeoff/landing distances.

The features, functions, and advantages can be achieved independently in various embodiments of the present invention or may be combined in yet other embodiments.

BRIEF DESCRIPTION OF THE DRAWINGS

The present invention will become more fully understood from the detailed description and the accompanying drawings, wherein:

FIG. 3 is a cross-sectional view taken at section 3—3 of FIG. 2;

FIG. 4 is a cross-sectional similar to FIG. 3 for a flap extended condition of operation for the wing;

DETAILED DESCRIPTION OF THE PREFERRED EMBODIMENTS

The following description of the preferred embodiments is merely exemplary in nature and is in no way intended to limit the invention, its application, or uses.

Figure 1:
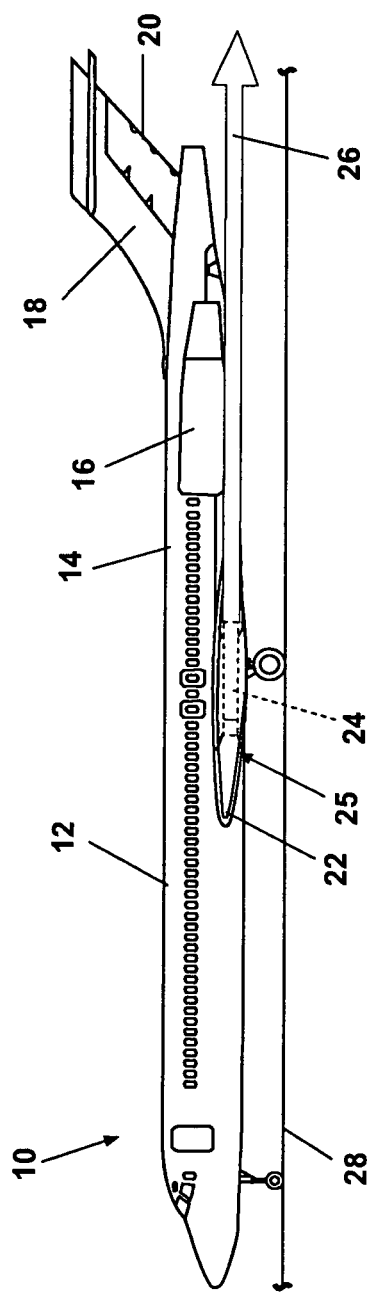
FIG. 1 is an elevational view of a horizontal augmented thrust system according to a preferred embodiment of the present invention installed on a commercial aircraft.

Referring generally to FIG. 1 and according to a preferred embodiment of the present invention, a horizontal augmented thrust system and method for creating augmented thrust of the present invention includes an augmented thrust system 10. An aircraft 12 including a fuselage 14, at least one flight propulsion engine 16, a tail 18, a rudder 20 and a port wing 22. Port wing 22 includes at least one pulse jet engine 24 completely enclosed within an outer envelope 25 of port wing 22. Each pulse jet engine 24 produces a horizontal augmented thrust 26. Aircraft 12 is normally propelled in a horizontal direction of flight by flight propulsion engines 16. In an exemplary use of augmented thrust system 10, aircraft 12 accelerates along a ground surface 28 such as a runway. Each of pulse jet engines 24 are ignited to produce horizontal augmented thrust 26 in addition to the thrust produced by flight propulsion engines 16. Horizontal augmented thrust 26 increases the net thrust produced by aircraft 12 during a temporary period such as take off or landing. Horizontal augmented thrust 26 further provides additional acceleration rate change for aircraft 12 which is particularly useful during the take off phase of aircraft 12. The horizontal augmented thrust 26 also increases lift produced by the flaps.

Figure 2:
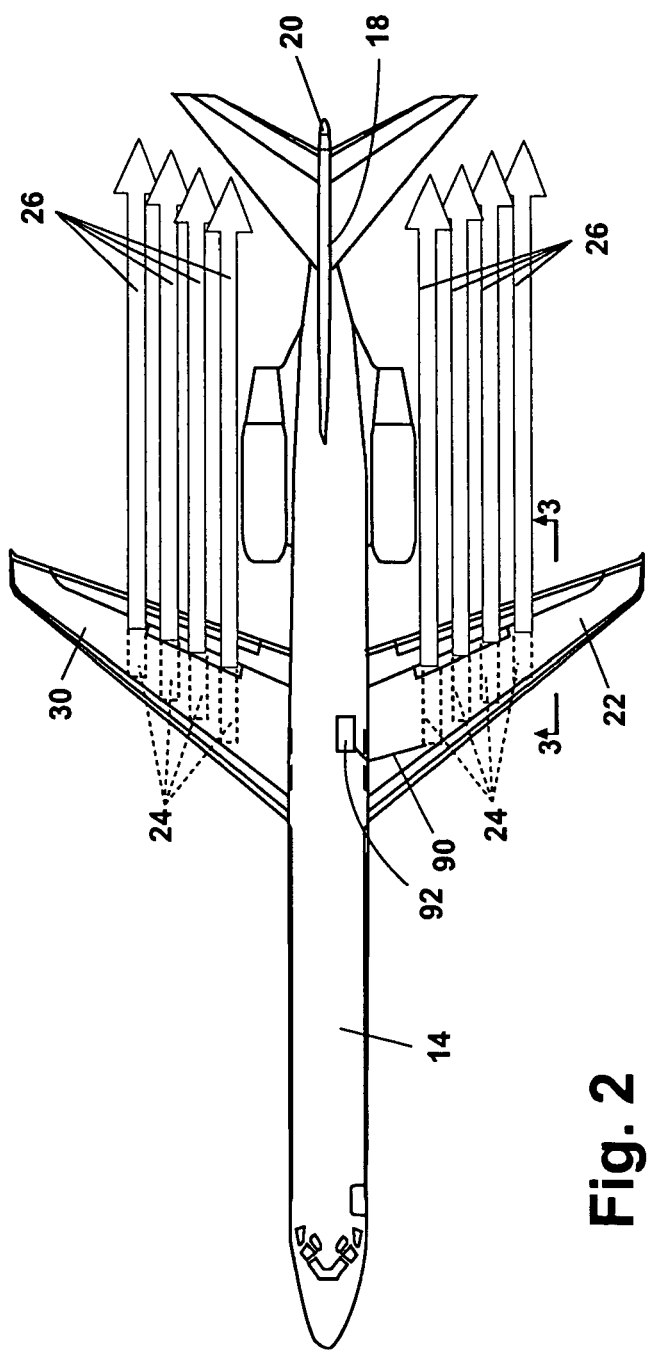
FIG. 2 is a plan view of the aircraft of FIG. 1.

Referring generally to FIG. 2, in addition to port wing 22 a starboard wing 30 extends from an opposite side of fuselage 14. As more clearly seen in FIG. 2, each of port wing 22 and starboard wing 30 can include a plurality of pulse jet engines 24 imbedded within the wings. Each pulse jet engine 24 produces its own component of horizontal augmented thrust 26. In a preferred embodiment of the present invention, each of port wing 22 and starboard wing 30 include an equal number of pulse jet engines 24 to equalize the thrust created by the engines and maintain substantially equal lift increases over the blown wing/flap surfaces. Pulse jet engines 24 of the present invention preferably have no moving parts and provide reflected back pressure waves for fuel/air ignition, similar to the pulse jet engines identified in U.S. patent application Ser. No. 10/245, 519, commonly assigned to the assignee of the present invention, the disclosure of which is incorporated herein by reference.

As best seen in FIG. 3, each wing (port wing 22 only is shown for example) includes at least one slat 31 positioned adjacent a wing leading edge 32. Slats 31 are rotatable and generally downwardly extendable as will be discussed in reference to FIG. 4. At least one flap 34 is positioned adjacent a wing trailing edge 36. Flap 34 is shown in a normally stowed position in FIG. 3. A pulse jet engine body 38 is positioned forward of flap 34 and connected via wing structural elements to port wing 22. FIG. 3 represents a wing embodiment during a normal cruise phase for aircraft 12. In the normal cruise phase, an incident air stream "A" splits at wing leading edge 32 to form an above-wing air stream "B" along a wing upper surface 33 and an under-wing air stream "C" along a wing lower surface 35. A steady boundary layer airflow represented by above-wing air stream "B" and under-wing air stream "C" produces both a component of lift and a minor component of drag. During this phase, each flap 34 is positioned generally as shown in its stowed position and each pulse jet engine 24 is non-operational.

Referring next to FIG. 4, during a take off or landing phase of aircraft 12, it is desirable to increase the component of lift generated by the wings 22,30 of aircraft 12. During these limited phases of operation of aircraft 12 each slat 31 is rotated generally forward and downward from the normally stowed position shown in FIG. 3 such that an aperture 40 is created adjacent the wing leading edge 32 shown in FIG. 3. A portion of incident air stream "A" is divided between above-wing air stream "B", a modified under-wing air stream "D" and an engine inlet-stream "E". Engine inlet-stream "E" enters aperture 40 and travels within a cavity formed within each of port wing 22 and starboard wing 30. Engine inlet-stream "E" enters each pulse jet engine 24 via an inlet diffuser 44 and then mixes with a fuel and is ignited within a detonation chamber 46. Resultant exhaust as thrust from pulse jet engines 24 is exhausted from a discharge end 47 as engine exhaust stream "F". During these phases of operation, each flap 34 is extended (normally by hydraulic actuation) to the right as viewed in FIG. 4, such that each flap 34 extends beyond and below wing trailing edge 36. Each flap 34 is also rotated below a wing axis 42 within a range of angles α. Angle α can vary between approximately 0° to approximately 90°. Normal orientation for flaps 34 is between approximately 20 to approximately 50 degrees for flap deployment angle α. Engine exhaust stream "F" discharges adjacent each flap 34 and increases an overall velocity of air passing over flaps 34. By extending and downwardly rotating each flap 34, a modified trailing edge air stream "G" results which together with engine exhaust stream "F" increases the effectiveness of flaps 34. A total camber of the wings of aircraft 12 is modified by the configuration shown in FIG. 4. Increasing the overall camber of wings 22 and 30 increases wing lift and drag, the increased lift reducing the wing stall speed. Engine exhaust stream "F" also acts as an additional component of horizontal thrust, increasing an acceleration rate of aircraft 12 during a take off phase of operation.

Figure 5:
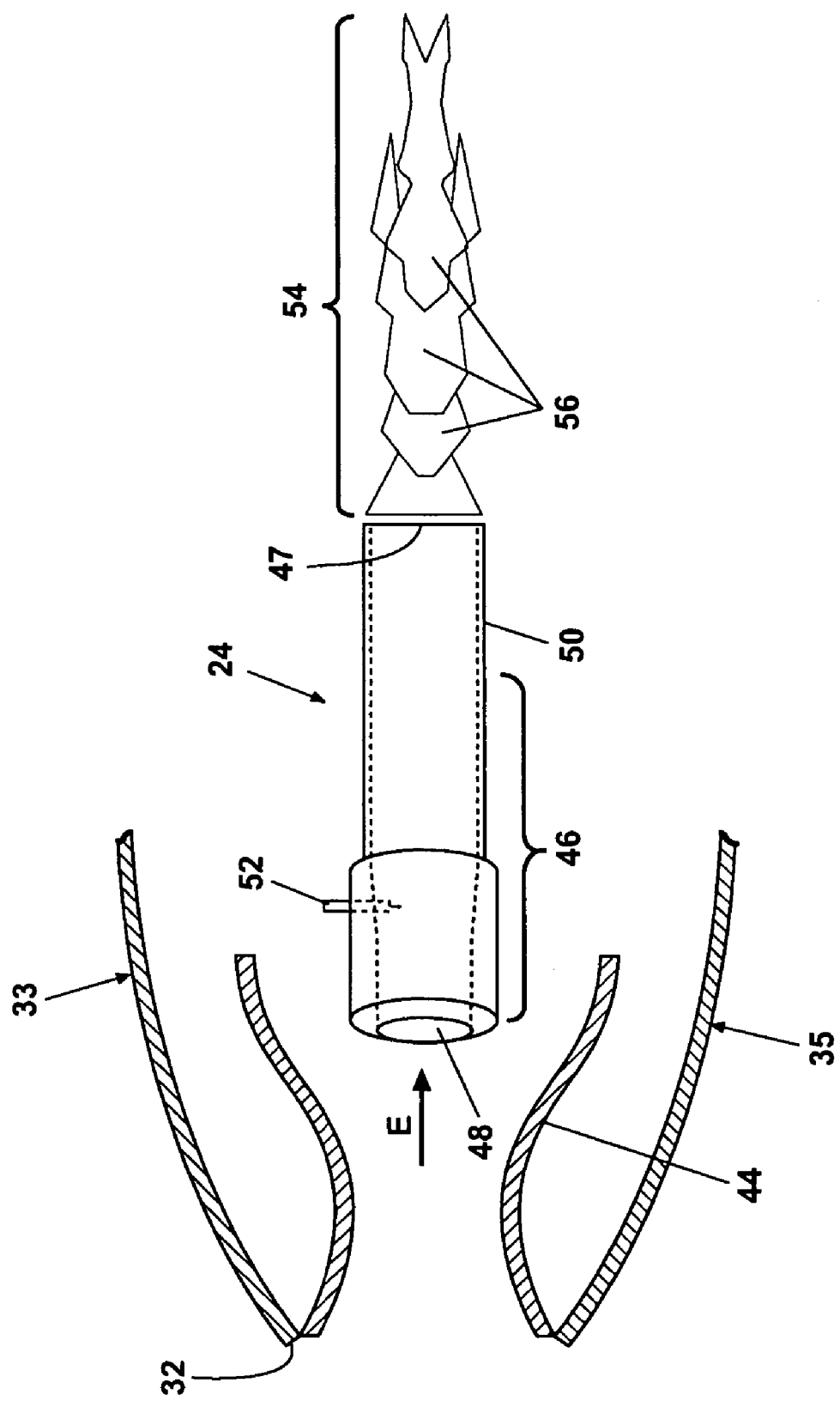
FIG. 5 is a partial cross section elevational view of a pulse jet exhaust stream of the present invention.

Referring now to FIG. 5, pulse jet engines 24 can include inlet diffuser 44 which directs engine inlet-stream "E" into detonation chamber 46 via an engine inlet 48. Detonation chamber 46 is enclosed by a main engine tube 50. An ignition source 52 such as a spark or glow plug can be inserted through main engine tube 50 to provide the initial energy required for the first ignition or deflagration cycle of the fuel/air mixture within pulse jet engine 24. This installation can also be integrated into the engine centerline such that it can be readily accessed via an inlet cavity formed when slats 31 are deployed. Once an ignition sequence is started, pulse jet engine 24, in a preferred embodiment of the present invention, produces a reflected pressure wave which ignites subsequent detonations of fuel/air mixtures within pulse jet engine 24 such that ignition source 52 is not required during these subsequent detonations.

Because pulse jet engine 24 produces a pulsed ignition of the fuel/air mixture, a pulsed exhaust formation 54 results. Pulsed exhaust formation 54 provides a plurality of expansion waves 56 downstream of discharge end 47. The pulsed nature of the plurality of expansion waves 56 decreases a buildup and thickening of boundary layer air flow identified as engine exhaust stream F' and modified trailing edge air stream "G" in FIG. 4. By preventing the buildup of boundary layer air flow adjacent flaps 34, air stream separation occurs at a greater flap deployment angle α than if a steady stream of airflow is used such as a ducted air flow system. A frequency of expansion waves 56 varies with the detonation frequency of pulse jet engine 24. In an exemplary embodiment of the present invention flaps 34 can be deployed by an additional approximately 5 to 20 degrees of flap deployment angle α than if a steady air stream were provided over flaps 34. The highly turbulent nature of the expansion waves also drive significant ambient flow entrainment compared to a steady jet operation. This intermittency further aids the reduction of noise from a lower velocity jet and lower temperature.

Figure 6:
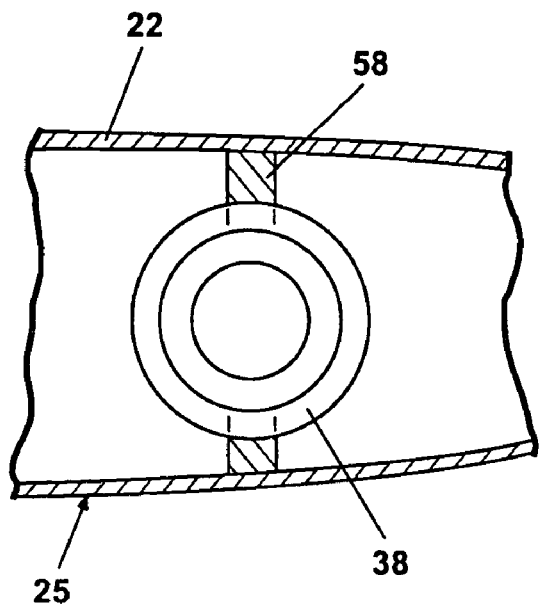
FIG. 6 is a partial cross-sectional view taken at section 6—6 of FIG. 3 showing a exemplary post jet engine supported within a wing by wing support structure according to a preferred embodiment of the present invention.

Referring next to FIG. 6, each pulse jet engine body 38 is structurally connected to surfaces of port wing 22 (as well as starboard wing 30) by incorporating pulse jet engine body 38 within a structural member 58 of the wing. This permits structural loads of the wing to be carried in part by each pulse jet engine 24. This benefit is achieved because the pulse jet engine of the preferred embodiment includes no moving parts, which significantly lowers maintenance compared to that of a conventional turbine engine. A quantity of access ports for pulse jet engines 24 required for maintenance can therefore be reduced compared to the quantity of access ports required for a conventional turbine or turbo-fan engine. This permits each pulse jet engine 24 to be completely enclosed within the wing envelope 25.

Figure 7:
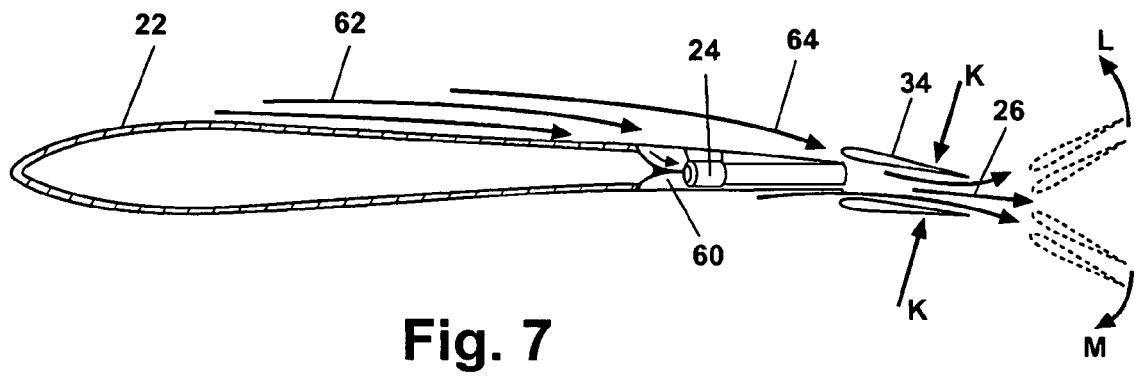
FIG. 7 is a cross-sectional view similar to FIG. 3 showing another preferred embodiment of the present invention.

Referring generally to FIG. 7, in another preferred embodiment of the present invention, pulse jet engines 24 are positioned similar to the configuration shown in FIG. 3 and supplied with air via an inlet chamber 60 positioned upstream of the pulse jet engine 24. Inlet chamber 60 is fed by a flow stream 62 diverted from the air stream, above or below the wing. In this embodiment, a bypass stream 64 is also provided aft of pulse jet engine 24 and forward of a pair of flaps 34. This permits the exhaust from pulse jet engine 24 to mix with the bypass stream 64 which both cools the temperature of the exhaust of pulse jet engine 24 and entrains additional air flow in the horizontal augmented thrust 26 produced. Flaps 34 can optionally be closed by moving towards each other in the direction of arrows "K", both rotated upwardly as shown by arrow "L", or both rotated downwardly as shown by arrow "M".

Figure 8:
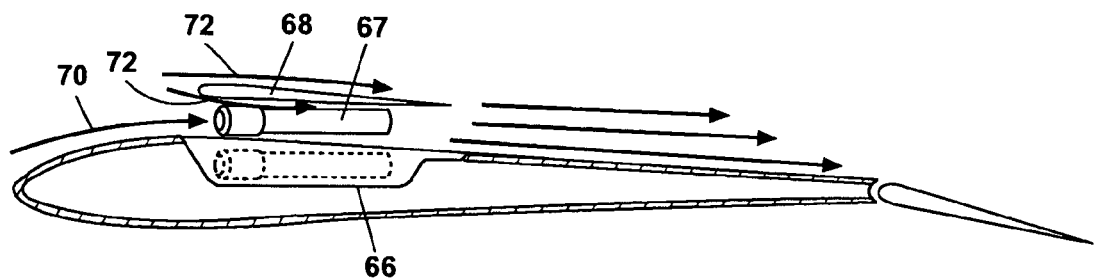
FIG. 8 is a cross-sectional view similar to FIG. 3 showing yet another preferred embodiment of the present invention which increases flow and velocity over the wing to enhance lift.

Referring next to FIG. 8, in yet another preferred embodiment of the present invention, pulse jet engines 24 are normally positioned within a cavity 66 formed within the wing for normal or cruising speed flight conditions of aircraft 12. The pulse jet engine 24 is deployed to a raised deployed position 67 when required. Deployment can be by a hydraulic or mechanical system (not shown). A deployable wing portion 68 which normally covers pulse jet engine 24 in the cruising mode of operation is also raised along with pulse jet engine 24 when positioned in the raised deployed position 67. An engine inlet stream 70 provides ignition air flow to pulse jet engine 24 and a plurality of engine bypass streams 72 both above and below deployable wing portion 68 permit bypass air to merge at the exhaust of pulse jet engine 24. This embodiment produces an upper surface blowing effect providing a coanda lift force for each wing.

Figure 9:
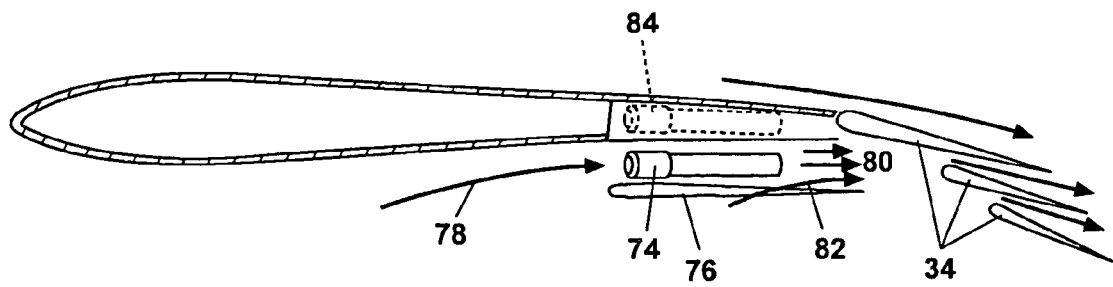
FIG. 9 is a cross-sectional view similar to FIG. 3 showing yet still another preferred embodiment of the present invention.

In yet still another preferred embodiment of the present invention and as shown in FIG. 9, pulse jet engines 24 which are normally positioned in a stowed position 84 can be lowered to a lower deployed position 74. A deployable wing portion 76 similar to deployable wing portion 68 is connected to pulse jet engine 24 and extends with pulse jet engine 24 in the lower deployed position 74. An engine inlet stream 78 provides air for combustion to pulse jet engine 24 in the lower deployed position 74. An engine exhaust stream 80 is produced which includes a horizontal component striking flap 34 (shown in each of a plurality of deployed positions). An engine bypass stream 82, similar to engine bypass stream 72, is entrainable with engine exhaust stream 80. In a stowed position 84, pulse jet engine 24 is completely positioned within an envelope of the wing such that deployable wing portion 76 forms a lower portion of the wing to reduce drag.

Figure 10:
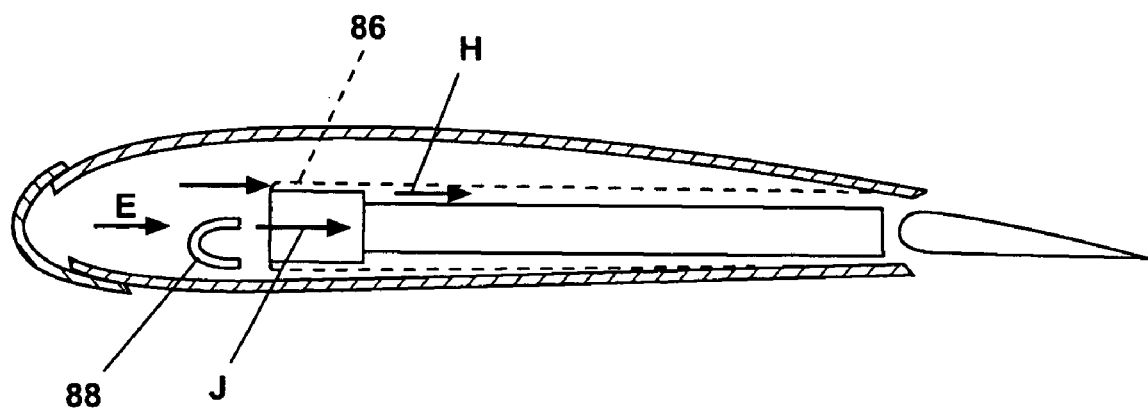
FIG. 10 is a cross-sectional view similar to FIG. 3 showing an auxiliary air feed system having a stand off or bypass air envelope for a pulse jet engine of the present invention.

Referring next to FIG. 10, and in yet still another preferred embodiment of the present invention, a reserved bypass envelope 86 is provided about each pulse jet engine 24. The purpose for reserved bypass envelope 86 is to permit a portion of engine inlet-stream "E" to pass about the outer envelope of pulse jet engine 24 which helps to cool pulse jet engine body 38 and reduce the heat transfer to the wing. A start-up air supply line 88 is also shown. Start-up air supply line 88 is shown as an exemplary pipe or tube, however, start-up air supply line 88 can also be formed as a duct. Start-up air supply line 88 provides an alternate source of engine inlet stream air which can be used when aircraft 12 is either motionless or traveling at a velocity which is insufficient to provide inlet air to detonation chamber 46. Start-up air supply line 88 provides air as start-up flow "J". Use of start-up air supply line 88 is optional and not required if pulse jet engines 24 are not started until aircraft 12 achieves a minimum velocity sufficient to provide engine inlet-stream "E". An air-start option may also be required for emergencies or operations at higher altitudes or elevated temperatures.

Referring back to both FIGS. 1 and 10, start-up air supply line 88 can be provided with airflow from an air source supply line 90 provided in each wing. Air source supply line 90 can in turn be connected to a start-up air source 92. Start-up air source 92 is shown for exemplary purposes only. Start-up air source 92 can be air ducted to the wings from each of the flight propulsion engines 16, air provided by a dedicated generator driven turbine, air provided by a dedicated reservoir, or similar air supply.

Figure 11:
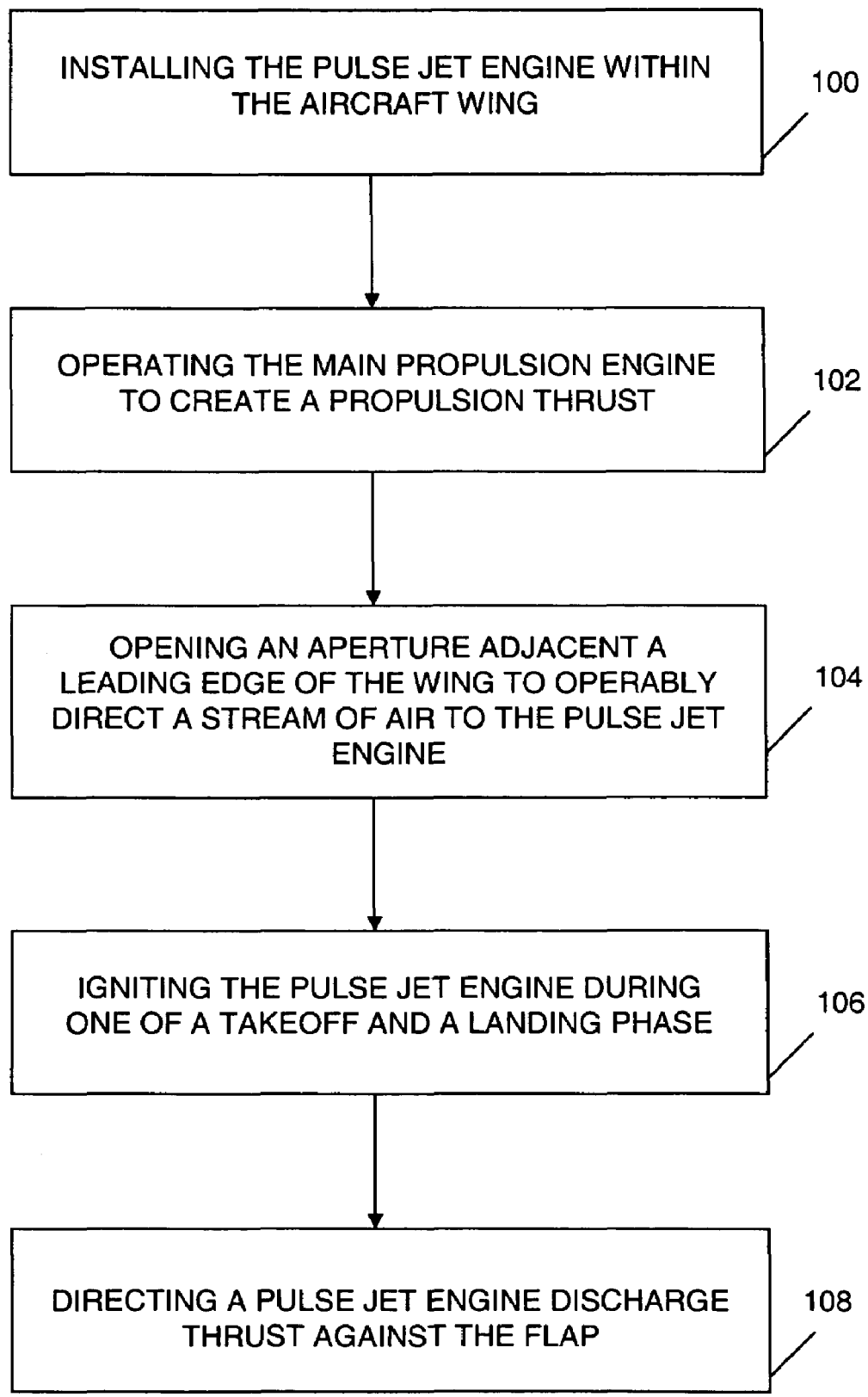
FIG. 11 is a flow diagram describing exemplary operations of a horizontal augmented thrust system of the present invention.

Referring generally to FIG. 11, in an operation 100 the pulse jet engine is installed within the aircraft wing. In an operation 102, the main propulsion engine is operated to create propulsion thrust for the aircraft. In a parallel operation 104, an aperture adjacent a leading edge of the wing is opened to direct a stream of air to the pulse jet engine necessary for combustion of the fuel delivered to the pulse jet engine. In a following operation 106, the pulse jet engine is ignited during one of a takeoff or a landing phase to create an additional augmentation thrust for the aircraft. In operation 108, the discharge of the pulse jet engine is directed against a flap.

Figure 12:
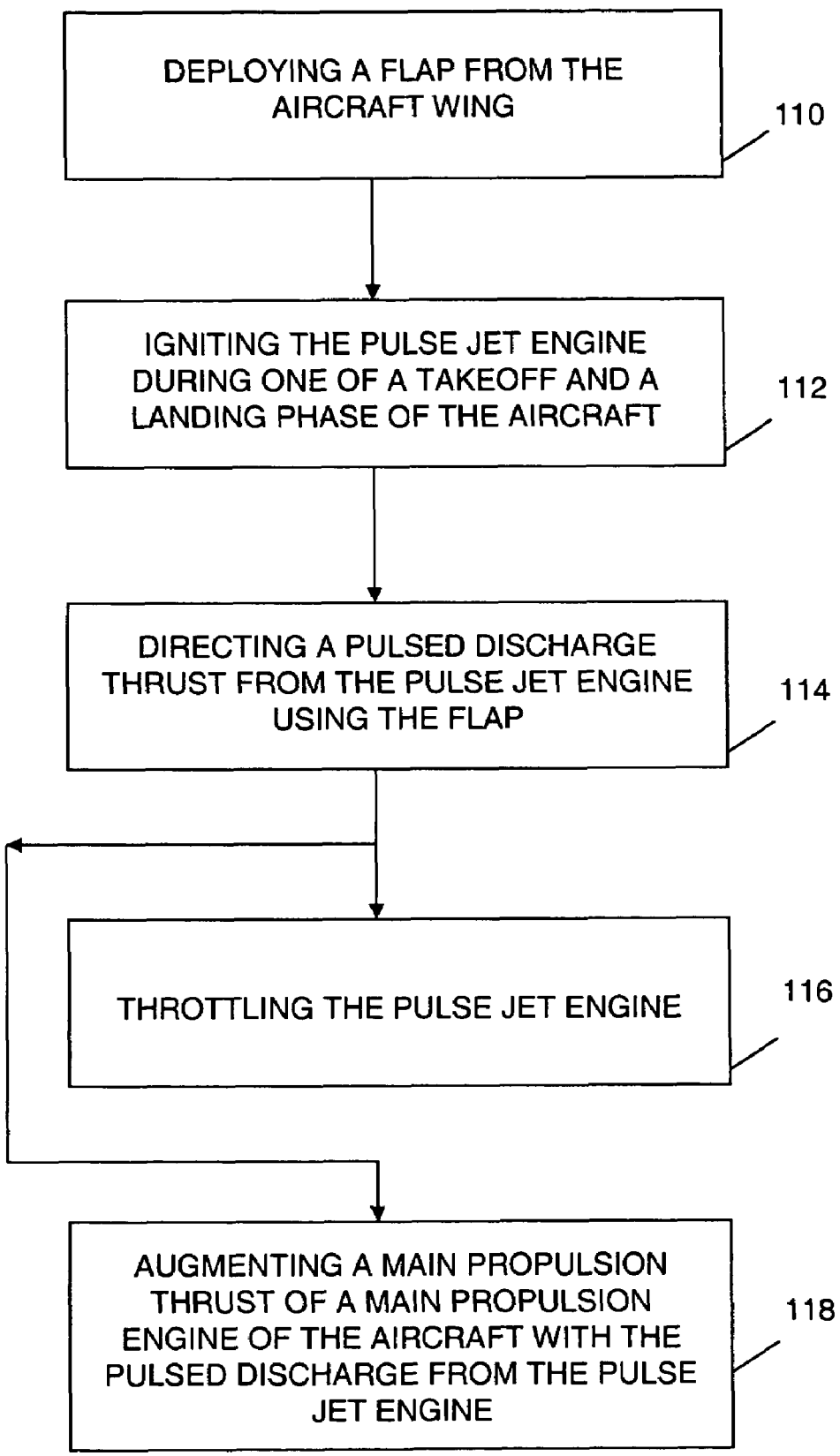
FIG. 12 is a flow diagram describing exemplary operations of another preferred embodiment of a horizontal augmented thrust system of the present invention.

Referring generally to FIG. 12, in an operation 110 a leading/trailing edge flap is deployed from the aircraft wing. In a following operation 112, the pulse jet engine is ignited during one of a takeoff or a landing phase of aircraft operation. In an operation 114, a pulsed discharge thrust from the pulse jet engine is directed using the flap. In a first parallel operation 116, the pulse jet engine is throttled. In a second parallel operation 118, a main propulsion thrust of a main propulsion engine of the aircraft is augmented with the pulsed discharge from the pulse jet engine.

A horizontal augmented thrust system and method for creating augmented thrust of the present invention offers several advantages. By positioning one or more pulse jets within the boundary of an aircraft wing, the pulsejets can directly provide a horizontal thrust component in addition to the thrust provided by the aircraft's main flight engine(s), thereby increasing thrust during takeoff and landing phases. Pulse jets of the present invention have no moving parts and can therefore be configured within the wings as integral load bearing structural wing members. The pulsed discharge of the pulse jet engines when directed over a wing flap increases air speed over the flap, therefore increasing wing lift. The pulsed discharge also delays buildup of boundary layer air on the flaps, therefore permitting an increased deployment angle of the flap(s) before air stream separation occurs. Use of pulse jets positioned entirely within the wings does not alter the wing aerodynamics, and therefore reduces the negative impact on aircraft range associated with wing externally mounted engines. Pulse jet engines in place of ducted air from a main flight engine also offer the capability of being throttled, which potentially provides an alternate source of thrust in the event a main propulsion engine is not functioning.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art. For example, smaller pulse jets may also be installed within the horizontal and/or vertical tails of an aircraft to further augment their effectiveness during takeoff or landing. By doing so, these surfaces may be reduced in size such that drag is reduced and fuel is saved.

What is claimed is:

1. An aircraft thrust augmentation system, comprising:
at least one wing, the wing having a wing outer envelope, a leading edge, and a trailing edge;
at least one pulse jet engine positionable entirely within the wing outer envelope; and
a movable slat defining a portion of the wing leading edge in a slat closed position, the slat being rotatable from the closed position to an open position operable to permit an air flow into a cavity in the wing leading edge defined when the slat is rotated, and from the cavity into the pulse jet engine;
wherein the pulse jet engine operably produces an augmented thrust dischargeable adjacent the trailing edge of the wing when the slat is rotated to the open position during only each of a takeoff phase and a landing phase of an aircraft.

2. The system of claim 1, comprising at least one flap disposable in each of a stowed and a deployed position, wherein the flap is positionable in the deployed position to operably deflect at least a portion of the thrust.

3. The system of claim 1, comprising an aircraft fuselage supporting the at least one wing.

4. The system of claim 3, comprising at least one flight propulsion engine connectable to one of the at least one wing and the aircraft fuselage, the flight propulsion engine operable to produce a thrust during each of the takeoff and landing phases and a cruise phase of the aircraft, the thrust of the flight propulsion engine supplemented by the augmented thrust of the pulse jet engine only during the takeoff and landing phases.

5. The system of claim 1, comprising:
an inlet diffuser connectable to the pulse jet engine; and
an engine inlet;
wherein the pulsejet engine is configurable as a tube, the inlet diffuser defining a curved shape adapted to direct the air flow into the engine inlet of the pulsejet engine.

6. An aircraft pulse jet engine thrust augmentation system, comprising:
an aircraft having at least one wing, each said wing including a wing outer envelope, a leading edge and a trailing edge;
at least one pulse jet engine having no moving parts and positionable entirely within the wing outer envelope;
a movable slat defining a portion of the wing leading edge in a slat closed position, the slat being rotatable from the closed position to an open position operable to permit an air flow into a cavity in the wing leading edge defined when the slat is rotated, and from the cavity into the pulse jet engine;
a wing flight control element rotatably connectable to the wing trailing edge and positionable within a range of deployment angles; and
at least one main propulsion engine operable to produce an aircraft main propulsion thrust;
wherein a pulse jet engine thrust in operable communication with the wing flight control element is operable to temporarily augment the main propulsion thrust during only each of a takeoff phase and a landing phase of the aircraft.

7. The augmentation system of claim 6, comprising:
a tube body defining each pulse jet engine;
a single structural member connecting the tube body to the wing;
an air bypass flow path locatable within the wing and external to each pulse jet engine operable to permit a portion of the air flow to flow about an outer envelope of each pulse jet engine to cool each pulse jet engine.

8. The augmentation system of claim 6, comprising a startup air supply device positionable adjacent each said pulse jet engine.

9. The augmentation system of claim 8, comprising:
a startup air supply line connectable to said startup air supply device; and
a source of startup air locatable within the aircraft and connectable to the startup air supply line.

10. The augmentation system of claim 6, comprising a glow plug connectable to each one of the at least one pulse jet engines, wherein the glow plug is operable to create an initial pulse jet engine detonation cycle.

11. The augmentation system of claim 6, comprising a pulsed exhaust formation created by each one of the at least one pulse jet engines.

* * * * *